A. C. WAIS.
BORING MILL.
APPLICATION FILED JAN. 19, 1918.
1,296,885.
Patented Mar. 11, 1919.
3 SHEETS—SHEET 3.
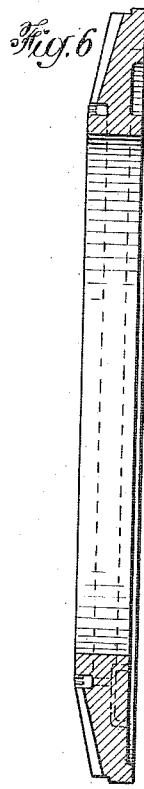
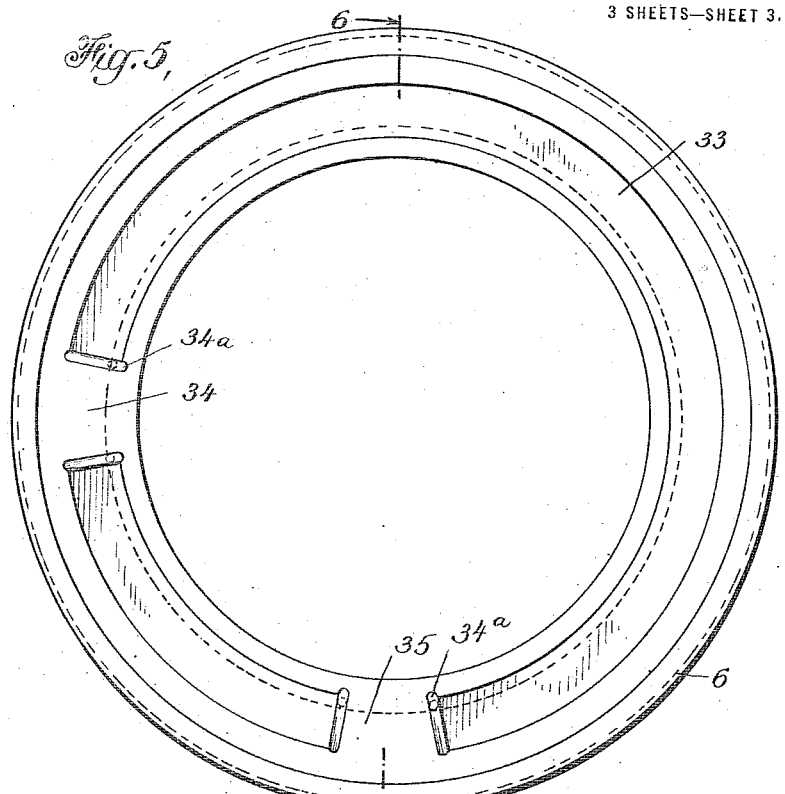
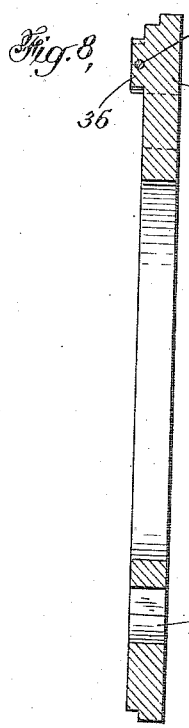
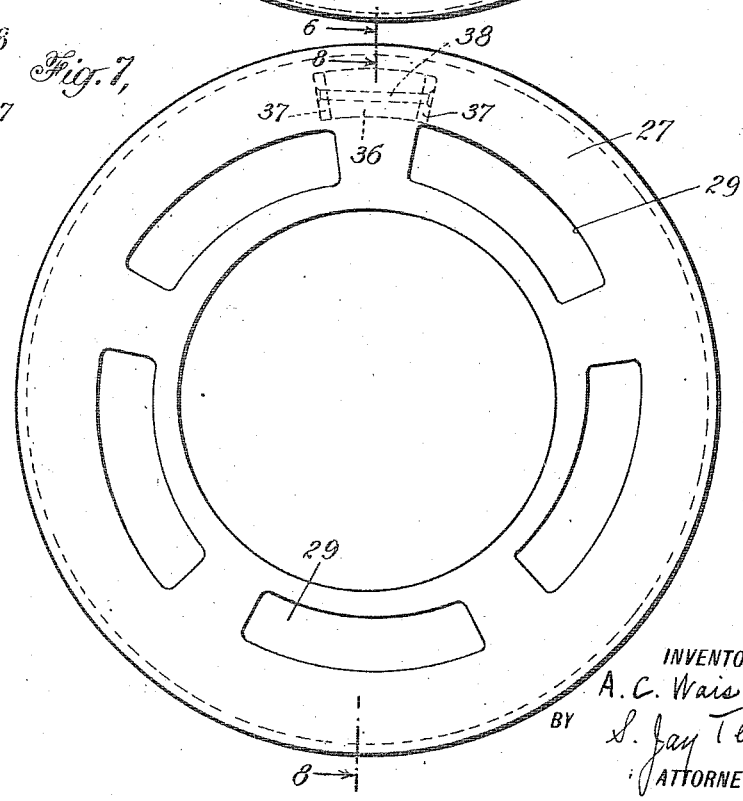
INVENTOR
A. C. Wais
BY S. Jay Teller
ATTORNEY

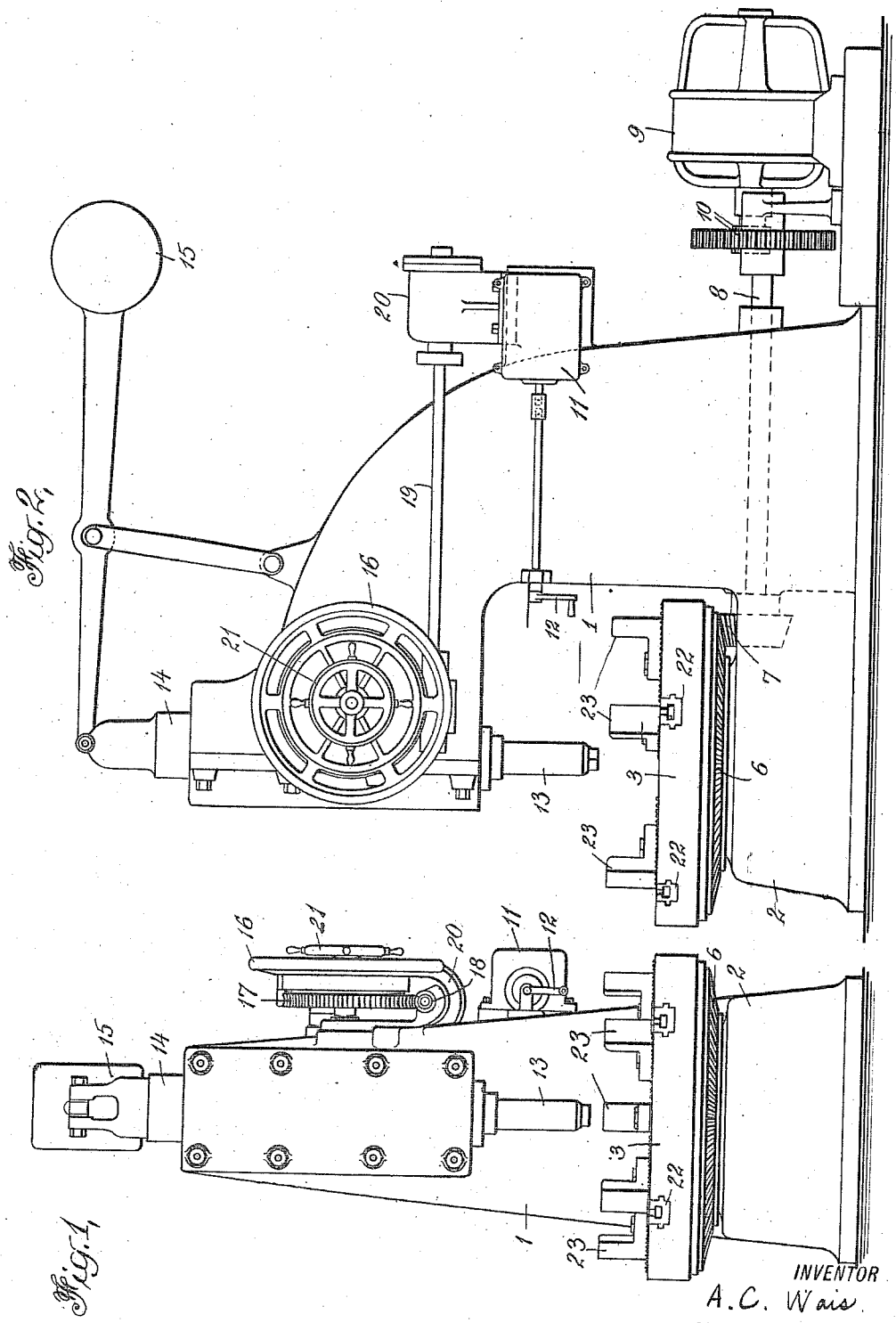

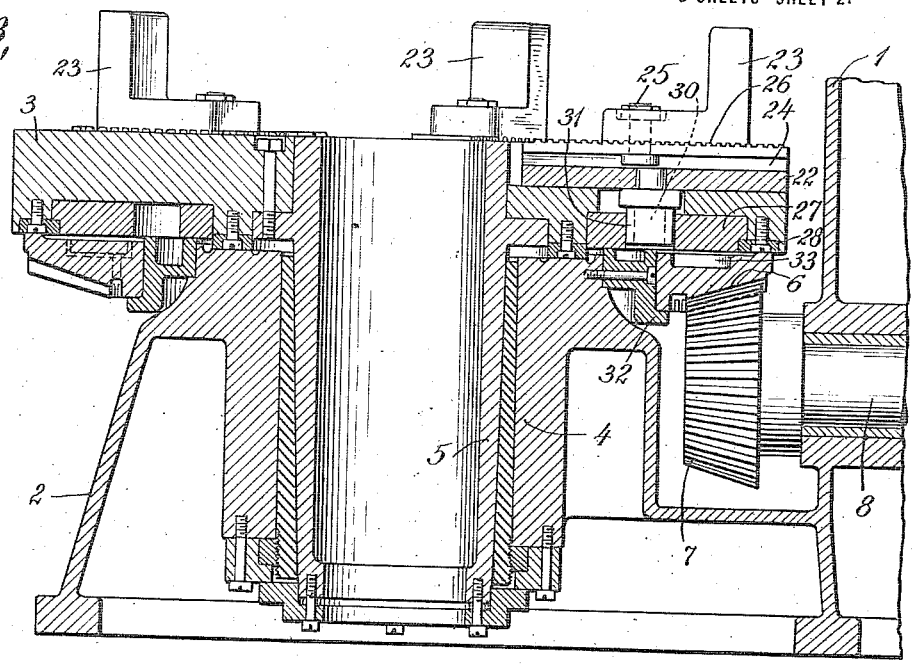
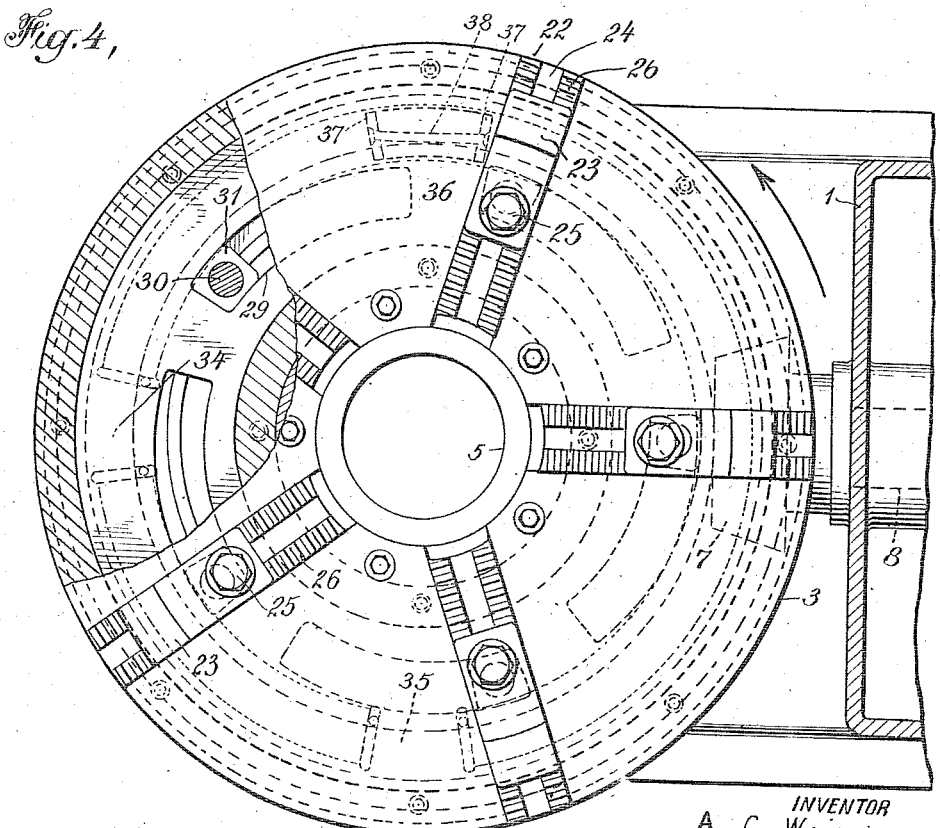

UNITED STATES PATENT OFFICE.

ALBERT CARL WAIS, OF HAMILTON, OHIO, ASSIGNOR TO NILES-BEMENT-POND COMPANY, OF NEW YORK, N. Y., A CORPORATION OF NEW JERSEY.

BORING-MILL.

1,296,885.

Specification of Letters Patent.  Patented Mar. 11, 1919.

Application filed January 19, 1918. Serial No. 212,579.

*To all whom it may concern:*

Be it known that I, ALBERT CARL WAIS, a citizen of the United States, residing at Hamilton, in the county of Butler and State of Ohio, have invented certain new and useful Improvements in Boring-Mills, of which the following is a specification.

The invention relates especially to boring mills which are primarily intended and adapted for boring car wheels or other similar bodies. The principal object of the invention is to provide for a mill of this type an improved chuck adapted to automatically grip the car wheel when the rotatable table is turned in the direction for boring and adapted to open at the conclusion of the boring operation. The invention relates particularly to improved means for opening the chuck. Further objects of the invention will be apparent from the following specification and claims.

In the accompanying drawings I have shown the embodiment of my invention which I now deem preferable, but it will be understood that various changes and substitutions of equivalents can be made without departing from the spirit of the invention as set forth in the claims appended to this specification.

Of the drawings:

Figure 1 is a front elevation of the boring mill embodying the invention.

Fig. 2 is a side elevation of the boring mill.

Fig. 3 is a fragmentary vertical sectional view on an enlarged scale showing the automatic chuck and associated parts.

Fig. 4 is a plan view of the chuck and associated parts.

Fig. 5 is a detail plan view of the gear ring by means of which the chuck and the table are operated.

Fig. 6 is a sectional view taken along the line 6—6 of Fig. 5.

Fig. 7 is a detail plan view of the cam ring or plate forming a part of the automatic chuck.

Fig. 8 is a sectional view taken along the line 8—8 of Fig. 7.

Referring to the drawings, 1 represents the main frame of the boring mill, this being formed with a bed 2 upon which is rotatably supported a table 3. As shown in Fig. 3, the bed is provided with a vertical bearing 4 in which rotates a hollow trunnion 5 secured to the table 3. Associated with the table 3 is a gear ring 6, the bevel teeth of which mesh with a bevel gear 7 carried by a horizontal longitudinal shaft 8. Through the shaft 8 power is supplied to rotate the table and a suitable means is provided for driving the shaft in either direction. A belt drive may be used, but preferably, as shown, the driving means comprises an electric motor 9 connected with the shaft through gearing 10. For starting, stopping and reversing the motor there is provided a controller 11 having an operating handle 12.

As shown at 13, the machine is provided with a vertical boring bar which is secured to a slide 14 vertically movable in a guideway on the upper part of the frame 1. The boring bar 13 is substantially in alinement with the axis of the table 3 and of the trunnion 5, and is adapted to carry a suitable boring tool. Preferably a counterbalance 15 is connected with the slide 14 in the way shown. For moving the slide and the boring bar vertically there is provided a suitable mechanism which includes a hand wheel 16. Preferably there is also a worm wheel 17 meshing with a worm 18 on a longitudinal shaft 19. Power means such as a change gear mechanism 20, suitably connected with the main drive, is provided for rotating the shaft 19 and thus turning the worm wheel and moving the slide and the boring bar vertically to effect feeding in direct relation to the rotation of the table. The worm wheel 17 can be either connected to or disconnected from the slide by means of a second hand wheel 21.

The table 3 is provided with a plurality of radial guideways in each of which is fitted a slide 22. Five such guideways or slots are shown in the drawings, but it will be understood that the number can be varied. Each slide 22 carries a jaw 23 and preferably the jaws are adjustable longitudinally in the slides. As shown, each slide has a T-slot 24 into which extends a bolt 25 engaging the corresponding jaw. Preferably each slide and jaw are provided respectively with intermeshing teeth 26 which serve to positively lock the jaw in position with respect to the slide when the bolt 25 is tightened.

A ring or plate 27 is mounted for rotation about the same axis as the table 3 and is capable of a limited rotative movement independent of the table movements. Preferably, as shown, the ring 27 is seated in an annular groove or channel in the bottom of the plate and is held in place by an annular clip or ring 28. Means is provided whereby rotative movement of the ring 27 with respect to the table 3 affects radial movements of the slides 22 and the jaws 23. Preferably this means is constructed as follows: The ring 27 is provided with a series of spiral slots or grooves 29 corresponding in number to the slides 22. Projecting downward from each slide and extending through a radial slot in the table is a pin 30. Fitted to each pin 30 is a shoe 31 which is adapted to fit the corresponding spiral groove 29. It will be seen that, when the ring 27 is moved with respect to the table in the direction of the arrow in Fig. 4, the several slides and jaws will be moved inward. When the ring is moved with respect to the table in the other direction, the several slides and jaws will be moved outward.

It will be understood that when the inside of a wheel rim or tire is to be gripped the direction of inclinations of the cam slots is reversed, thus reversing the directions of movements of the slides and jaws.

The aforesaid gear ring 6 is supported independently of the table 3 and of the ring 27. As shown, it is carried by a bearing ring 32 secured to the bed 2. Formed in the upper part of the gear ring 6 is an annular groove 33 in which are one or more obstructions. As shown, there are two obstructions 34 and 35 placed about 90° apart, and these are formed as integral parts of the gear ring casting. Preferably renewable plates 34ª are fitted into grooves at the sides of the obstructions 34 and 35. The cam ring 27 is provided with a lug 36 which projects into the groove 33. Preferably the projection 35 carries at its opposite sides two shoes 37, 37 held in place by a pin 38 extending through the lug.

In operation, a car wheel to be bored is placed on the table with its axis substantially coincident with the table axis, the several jaws 23 being in proximity to the periphery of the wheel. It will be understood that the jaws can be adjusted on the slides to correspond to wheels of different diameters. Then the motor 9 is started by means of the controller 11 to drive the gear ring 6 in the direction indicated by the arrow in Fig. 4. As soon as the obstruction 35 engages the lug 36 the cam ring 27 is started in the direction of the arrow and turns relatively to the table 3. This relative turning movement serves to move all of the slides 22 and jaws 23 inward. This movement continues until the jaws 23 firmly engage the periphery of the wheel, whereupon relative movement between the ring and the table ceases and the table starts to rotate carrying the wheel with it. This rotative movement of the table and of the wheel is continued and the boring bar 13 is fed downward to bring the boring tool into engagement with the hub of the wheel. The boring operation is effected in the usual way.

At the end of the boring operation the jaws 23 remain firmly engaged with the wheel and special means must be provided for disengaging them. They can be disengaged by moving the cam ring relatively to the table in the direction opposite to the arrow in Fig. 4, but, because of the clamping action which has taken place, this relative movement can not be easily effected. It will be apparent from the description which has already been given that considerable lost motion is permitted between the gear ring 6 and the cam ring 27. Advantage is taken of this lost motion for applying a powerful blow to drive the ring 27 backward in the direction to release the jaws. At the conclusion of the turning operation the motor 9 is started in the reverse direction by means of the controller 11, thus driving the gear ring 6 in the direction opposite to the arrow in Fig. 4. The gear ring is relatively heavy and acquires considerable momentum. Its rotation continues until the obstruction 34 engages the lug 36 on the cam ring, thus applying a blow which tends to rotate the ring backward. In many cases a single blow will be sufficient to drive the ring far enough to entirely release the jaws, but, if necessary, by reversing the motor, subsequent blows may be delivered until the jaws are released.

It will be seen that by this construction I have provided a simple chuck which automatically engages and centers the car wheel when the table is started in the operative direction. The means for releasing the jaws is simple in construction and is entirely self contained within the outlines of the table and the gear ring and is capable of operation without the provision of any special levers or other manually controlled devices. The releasing device is operated entirely by the main controlling device, in this case the electrical controller 11, which must in any case be provided for governing the operation of the boring mill.

What I claim is:

1. In a boring mill, the combination of a rotatable work table, a plurality of radially movable jaws on the table, a ring rotatable coaxially with the table and capable of relative movement independently thereof, means dependent on relative movement of the ring in one direction or the other for moving the jaws into or out of engagement with the work, means for rotating the ring in the direction to first engage the jaws with the work and to then rotate the table, and means movable in the opposite direction for applying a blow to start the ring in the opposite direction and thus release the jaws from the work.

2. In a boring mill, the combination of a rotatable work table, a plurality of radially movable jaws on the table, a ring rotatable coaxially with the table and capable of relative movement independently thereof, means dependent on relative movement of the ring in one direction or the other for moving the jaws into or out of engagement with the work, a gear rotatable coaxially with the table and the ring, and a lost motion connection between the gear and the ring for rotating the ring in the direction to first engage the jaws with the work and to then rotate the table, the said lost motion connection enabling the gear at the end of rotation in the said direction to apply a blow to the ring in the opposite direction and thus release the jaws from the work.

3. In a boring mill, the combination of a rotatable work table, a plurality of radially movable jaws on the table, a ring rotatable coaxially with the table and capable of relative movement independently thereof, means dependent on relative movement of the ring in one direction or the other for moving the jaws into or out of engagement with the work, a gear rotatable coaxially with the table and the ring, a loss motion connection between the gear and the ring for rotating the ring in the direction to first engage the jaws with the work and to then rotate the table, and a reversible driving mechanism for the gear, whereby the direction of rotation of the gear may be reversed to apply a blow to the ring in the opposite direction and thus release the jaws from the work.

4. In a boring mill, the combination of a rotatable work table, a plurality of radially movable jaws on the table, a ring rotatable coaxially with the table and capable of relative movement independently thereof, means dependent on relative movement of the ring in one direction or the other for moving the jaws into or out of engagement with the work, a gear rotatable coaxially with the table and the ring, means for rotating the gear in either direction, and engaging lugs carried respectively by the ring and the gear and adapted to permit limited movement of the gear independently of the ring.

5. In a boring mill, the combination of a rotatable work table, a plurality of radially movable jaws on the table, a ring positioned below the table and rotatable coaxially therewith and capable of relative movement independently thereof, a downward projecting lug on the ring, means dependent on relative movement of the ring in one direction or the other for moving the jaws into or out of engagement with the work, a gear positioned below the ring and rotatable coaxially with the table and the ring, the gear having an annular groove into which the lug on the ring projects, and an obstruction in the groove for engaging the lug, the said lug and obstruction permitting limited movement of the gear independently of the ring.

In testimony whereof, I hereto affix my signature.

ALBERT CARL WAIS.